United States Patent
Snyder et al.

(10) Patent No.: US 6,530,201 B2
(45) Date of Patent: Mar. 11, 2003

(54) EASILY REMOVABLE MOISTENER STAND SUPPORT FOR A COTTON HARVESTER DRUM

(75) Inventors: Earl R. Snyder, Davenport, IA (US); Frank C. Dupire, Sherrard, IL (US); Guy N. Thedford, Naperville, IL (US); Lyle P. Mangen, Bettendorf, IA (US)

(73) Assignee: Case Corporation, Racine, WI (US)

(*) Notice: Subject to any disclaimer, the term of this patent is extended or adjusted under 35 U.S.C. 154(b) by 29 days.

(21) Appl. No.: 09/888,676

(22) Filed: Jun. 25, 2001

(65) Prior Publication Data

US 2002/0194828 A1 Dec. 26, 2002

(51) Int. Cl.[7] .......................... A01D 46/14; A01D 46/16
(52) U.S. Cl. ................................. 56/50; 56/41
(58) Field of Search ................................ 56/28, 36, 41, 56/44, 50, 40–47

(56) References Cited

U.S. PATENT DOCUMENTS

| | | | |
|---|---|---|---|
| 2,433,083 A | 12/1947 | Baker et al. | 56/41 |
| 3,004,376 A | 10/1961 | Hubbard | 56/41 |
| 3,224,178 A | 12/1965 | Kennedy | 56/41 |
| 3,505,799 A | 4/1970 | Fergason | 56/41 |
| 3,546,862 A | 12/1970 | Fergason | 56/41 |
| 4,461,140 A | 7/1984 | Carmi et al. | 56/50 |
| 4,850,184 A | 7/1989 | Deutsch et al. | 56/41 |
| 4,905,464 A | 3/1990 | Thedford | 56/50 |
| 5,014,502 A | 5/1991 | Richman et al. | 56/41 |
| 5,355,663 A | 10/1994 | Deutsch et al. | 56/12.1 |
| 5,467,582 A | 11/1995 | Panoushek et al. | 56/10.2 R |
| 5,471,826 A | 12/1995 | Schreiner | 56/41 |
| 5,557,911 A | 9/1996 | Sanderson et al. | 56/41 |
| 5,722,224 A | 3/1998 | Sheldon, Jr. et al. | 56/41 |

*Primary Examiner*—Thomas B. Will
*Assistant Examiner*—Alicia Torres
(74) *Attorney, Agent, or Firm*—John William Stader; Larry W. Miller

(57) ABSTRACT

An easily removable support for a moistener stand or column of a harvesting unit of a cotton harvester, which tilts the stand or column when rotated from an operative position to a service position, to raise a plurality of moistening pads of the stand or column relative to picker spindles of the harvesting unit. The moistener stand or column is then merely lifted to disconnect the support for removal, and when reinstalled and/or rotated back to the operative position, previous fore, aft and height adjustments of the moistening pads are retained.

15 Claims, 7 Drawing Sheets

EASILY REMOVABLE MOISTENER STAND SUPPORT FOR A COTTON HARVESTER DRUM

TECHNICAL FIELD

The present invention generally relates to cotton harvesters and, more particularly, to a moistener stand support for a drum of a cotton harvester which is simple yet easily rotatable, pivotable or otherwise movable within the confines of a cabinet containing the drum and the moistener stand for accessing the moistening pads for service, maintenance and inspection, and for removing the moistener stand when required.

BACKGROUND ART

A typical cotton harvesting machine or harvester includes two or more harvesting units for harvesting cotton from rows of cotton plants during a harvesting procedure. Each harvesting unit includes one or more harvesting mechanisms comprised of multiple inter-related parts. A typical drum has a picker rotor assembly with doffer assemblies arranged in combination therewith. Each picker rotor assembly includes a series of upright picker bars capable of being oscillated about their respective upright axes. Each picker bar has a plurality of picker spindles arranged thereon one above the other. The picker spindles of each picker bar are rotatably driven by a driving arrangement within the picker bar. During forward motion of the machine, the picker spindles are brought into contact with the cotton plants to remove the cotton. The doffer assemblies then remove the cotton from the picker spindles. The doffer assemblies typically include pairs of opposing doffer pads between which the individual picker spindles are passed to remove the cotton therefrom. The picker spindles then pass through a picker spindle moistening assembly including a series of vertically arranged moistening pads supported on a moistener stand for adding moistening fluid to each of the picker spindles before they are introduced to the cotton plant again. After removal from the picker spindles, the cotton is blown by fans through ducts to a large basket located on the harvesting machine.

Over time, the moistening pads can become worn, and dirt, lint and other material can collect thereon, so as to require service and/or maintenance. And, at some point, the pads become sufficiently worn or damaged so as to require replacement. The moistener stands supporting the moistening pads are located within a cabinet or housing, typically in closely spaced relation to the above referenced drum components, and also to the sides and braces of the cabinet itself, necessitating rotating or moving the moistener stand at least somewhat from an operative position for moistening the picker spindles, to a service position which allows service or operator personnel to access the moistening pads. Reference in this regard, Deutsch et al. U.S. Pat. No. 4,850,184 issued Jul. 25, 1989 to Deere and Company, which discloses a rotating moistener column for a cotton harvester including a rotating base structure including indexing structure for firmly securing the moistener column in a first rotational operating position or a service position angularly related to the operating position. However, for some service procedures it is not preferable to lock the column in the service position, and, often, the needed service is better accomplished by removing the entire column or stand, which is not readily facilitated by the referenced construction. The referenced construction also requires a height adjustment each time after service. It is sometimes desired or required to remove the moistener stand for service, and for accessing the other picker drum components. However, another shortcoming of some known moistener column or stand constructions is that removal thereof requires loosening fasteners and adjustment fittings which hold the column or stand in a particular position heightwise, and also fore and aft, relative to the picker spindles, thus requiring making new positional adjustments when the column is reinstalled.

Accordingly, it would be desirable to provide a mounting structure for a moistener stand or column of a cotton harvester which facilitates repositioning and/or removing the stand or column for service, inspection and maintenance, and reinstalling the moistener stand or column without requiring readjusting the height or fore and aft positions thereof, and which overcomes the other shortcomings and problems discussed above.

SUMMARY OF THE INVENTION

According to the invention, an improved support for a moistener stand or column of a harvesting unit of a cotton harvester is disclosed. In addition to the moistener stand, the harvesting unit includes a cabinet having a top portion and a bottom portion defining a space containing a picker drum including at least one upright bar carrying a plurality of rotatably driven picker spindles arranged in a row one above the other. The moistener stand is elongate and upright, and supports a plurality of moistening pads arranged in a row one above the other for moistening the picker spindles, the moistener stand having an upper end and an opposite lower end. The top portion of the cabinet includes a receptacle which receives and holds the upper end of the moistener stand for rotation therein about a rotational center thereof. The improvement comprises a support pivotably connecting the lower end of the moistener stand to the bottom portion of the cabinet, the support positioning the moistener stand in a predetermined operative position and orientation wherein the moistening pads are positioned for contacting the picker spindles, and the support including a pivot offset from the rotational center of the receptacle such that when the moistener stand is rotated about the rotational center in a first direction away from the operative position, the moistener stand will be pivoted so as to be tilted relative to the bottom portion of the cabinet to raise the moistening pads relative to the picker spindles. In the pivoted position, to remove the moistener stand, it is simply raised to disconnect the lower end from the bottom portion of the cabinet, tilted further, and passed through an access opening of the cabinet portion.

Because there can be as many as twenty or so moistening pads supported on each moistener stand, an advantage of raising the pads from the picker spindles when the moistener stand is rotated away from the operative position, is that it makes the rotation easier, as the moistening pads do not significantly contact the picker spindles. Another advantage is that the present support is simpler than prior known supports. Also, because the moistener stand is tilted when it is rotated, the lower end is not dragged as much over dirt and dust covered surfaces, and the moistener stand can be manipulated more easily within the close confines of the cabinet or housing. Further, the present invention allows the moistener stand to be removed while retaining the height and fore and aft positional settings thereof relative to the picker spindles, such that removal and replacement is quick and easy.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
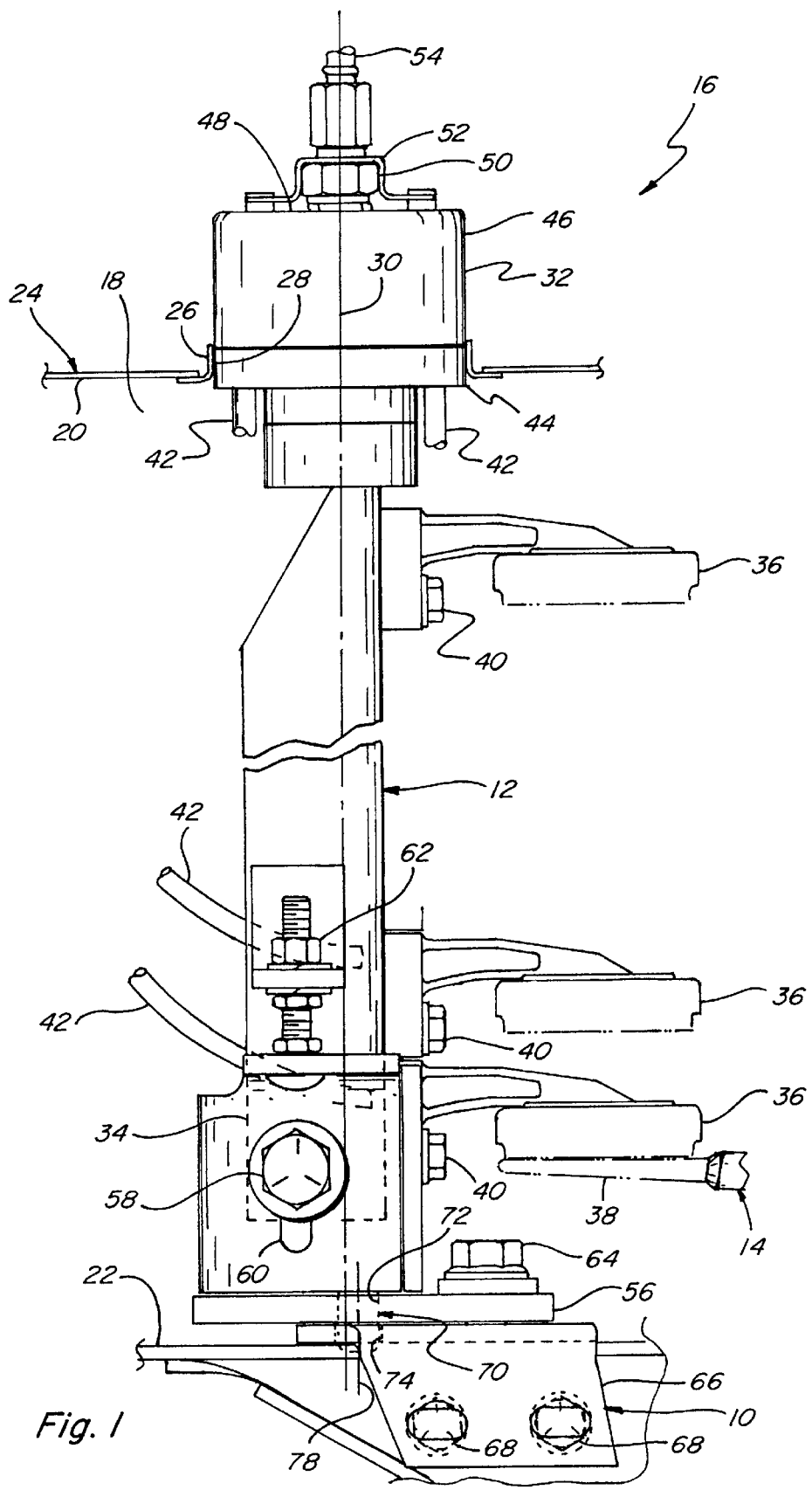
FIG. 1 is a simplified side elevational view of an improved support according to the present invention, supporting a moistener stand in a cabinet of a harvesting unit of a cotton harvester, the moisture stand being located in an operative position with one of the moistening pads thereof in contact with a representative picker spindle of the harvesting unit shown in phantom.

Referring now to the drawings, wherein a preferred embodiment of the present invention is shown, FIG. 1 shows a support 10 constructed and operable according to the teachings of the present invention, connected to and supporting a conventionally constructed moistener stand 12 of a harvesting unit 14 of a cotton harvester 16. Support 10 and moistener stand 12 are located in an interior space 18 defined by a spaced apart top surface 20 and bottom surface 22 of a housing or cabinet 24 of harvesting unit 14, and side walls (not shown). Top surface 20 includes a receptacle 26 defining an aperture 28 having a center of rotation 30 therethrough. Receptacle 26 cooperatively receives and supports an upper end 32 of moistener stand 12 for rotation therein about center of rotation 30. Moistener stand 12 is an elongate member and includes a lower end 34 opposite upper end 32. Moistener stand 12 supports a plurality of moistening pads 36 arranged in a row spaced one above the other, which, when moistener stand 12 is in an operative position as shown, are positioned for contacting and moistening respective picker spindles of harvesting unit 14 which are arranged in corresponding rows spaced one above the other, as represented by picker spindle 38 shown. Moistening pads 36 are removably mounted individually to moistener stand 12 with bolts 40 threadedly received in threaded apertures (not shown) in stand 12. Each moistening pad 36 is connected by a fluid line 42 to a moisture distributor cup 44 which forms a part of upper end 32 of moistener stand 12. Moisture distributor cup 44, in turn, has a cap 46 thereon having a top surface 48 with an aperture therein (not shown) which receives a nozzle 50 releasably held in place therein by a wire bail 52 pivotably mounted on cap 46. Nozzle 50 is connected to a fluid line 54 connected to a source of fluid (not shown) and operates to spray liquid into moisture distributor cup 44, which in turn distributes the fluid to fluid lines 42 for flow to moistening pads 36.

Figure 2:
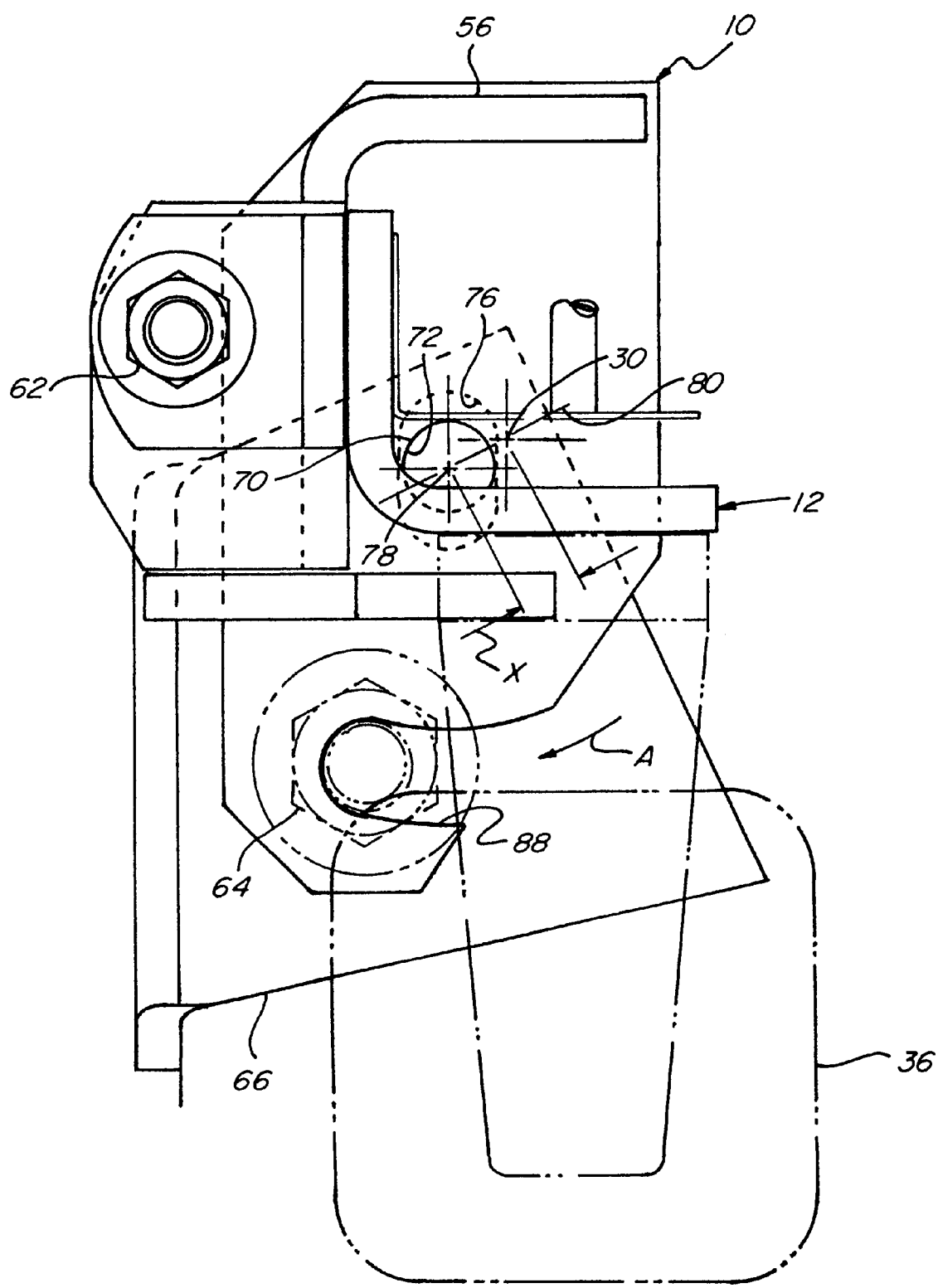
FIG. 2 is simplified top view of the support and moistener stand of FIG. 1 including a representative moistening pad shown in phantom.

Referring also to FIG. 2, moistener stand 12 is comprised of an elongate metal member of L shape cross-section. Support 10 includes a bottom bracket 56 mounted to moistener stand 12 with a bolt 58 (FIG. 1) which passes through an elongate slot 60 in bottom bracket 56 and is threadedly received in a threaded aperture (not shown) in or on moistener stand 12. The height or vertical position of moistener stand 12 relative to bottom bracket 56, and thus the vertical position of moistening pads 36 relative to picker spindles 38, is adjustable using an adjusting nut assembly 62 connected between bottom bracket 56 and moistener stand 12. Bottom bracket 56 and moistener stand 12 can be releasably secured or fixed in the operative position by a locking bolt 64 which passes through an arcuate slot 88 in bracket 56 (FIG. 2) and is threadedly received in a threaded hole in a base 66. Base 66 is an L shape member mounted on bottom surface 22 of cabinet 24 by bolts 68, which bolts 68 pass through elongate slots in base 66 and are threadedly received in threaded holes in cabinet 24. Base 66 is movable fore and aft within the slots when bolts 68 are loose, to allow adjusting the fore to aft (toward or away from picker spindles 38) position of moistener stand 12 and moistening pads 36. Bottom bracket 56, importantly, is pivotally connected to base 66 by a pivot pin 70 which is preferably press fit in a hole 72 in bottom bracket 56 or otherwise secured thereto so as to project outwardly therefrom so as to be cooperatively received in a larger hole 74 in base 66 as shown, for pivotal movement therein. A clearance hole 76 is provided in bottom surface 22 of cabinet 24 to allow projection of pivot pin 70 past the bottom of base 66. Hole 74 in base 66 is slightly or marginally larger in diameter than pivot pin 70 such that pin 70 can pivot in hole 74. By pivot, it is meant that pin 70 can rotate and tilt in hole 74 at a small acute angle relative to a pivotal axis 78 thereof. Pivotal axis 78 is offset from center of rotation 30 by an amount X when viewed from above (FIG. 2), along a skew line or tilt axis 80, which intersects or extends through or close to both center of rotation 30 and pivotal axis 78. For the moistener stand 12 shown, amount X is preferably at least about ¼ inch, and can be as much as about ¾ to about 1 inch, such that when moistener stand 12 is rotated in the direction denoted by arrow A away from the operative position, moistener stand 12 will tilt relative to the orientation thereof when in the operative position such that moistening pads 36 will be raised or lifted relative to picker spindles 38, thereby reducing the drag or resistance to the rotation resulting from the contact between moistening pads 36 and picker spindle 38. This resistance can be a relatively significant force, due to the number of moistening pads involved, and reducing the force to the extent possible by tilting moistener stand 12 makes it easier to rotate moistener stand 12 away from the operative position to service positions angularly related thereto, such as the representative service position shown in FIG. 3. Also, when moistener stand 12 is tilted in the service positions, the bottoms of the moistening pads 36 are easier to see and access for cleaning and replacement.

Figure 3:
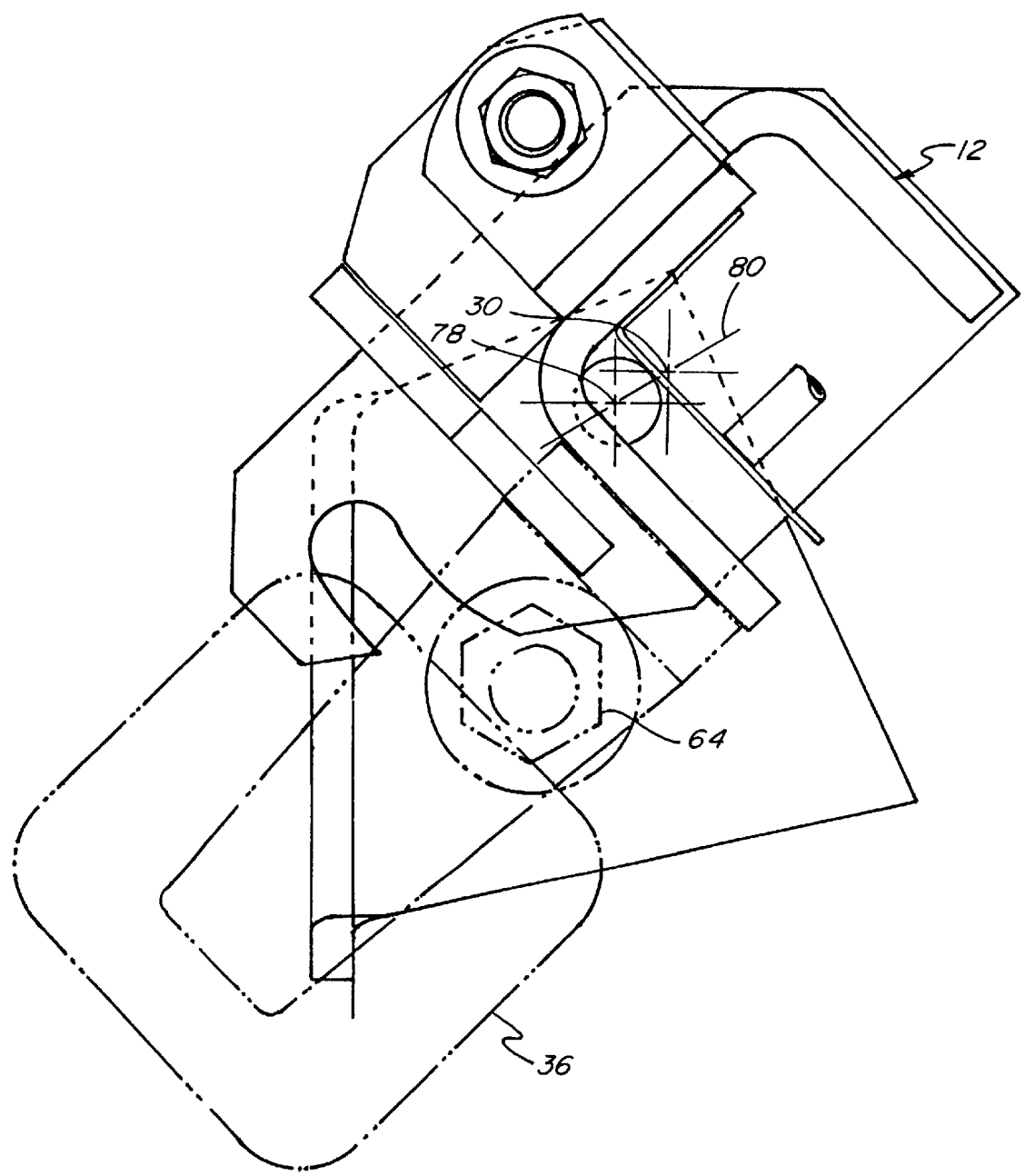
FIG. 3 is a simplified top view of the support and moistener stand of FIG. 1 rotated to a service position.

Referring to FIG. 3, as noted above, moistener stand 12 is easily and quickly movable from the operative position (FIGS. 1 and 2) to a service position such as that shown, by loosening the single bolt 64, manually grasping stand 12, and rotating it to the desired position, the stand 12 automatically tilting about tilt axis 80 through center of rotation 30 and pivotal axis 78 to raise or lift the moistening pads 36 during the rotation.

Figure 4:
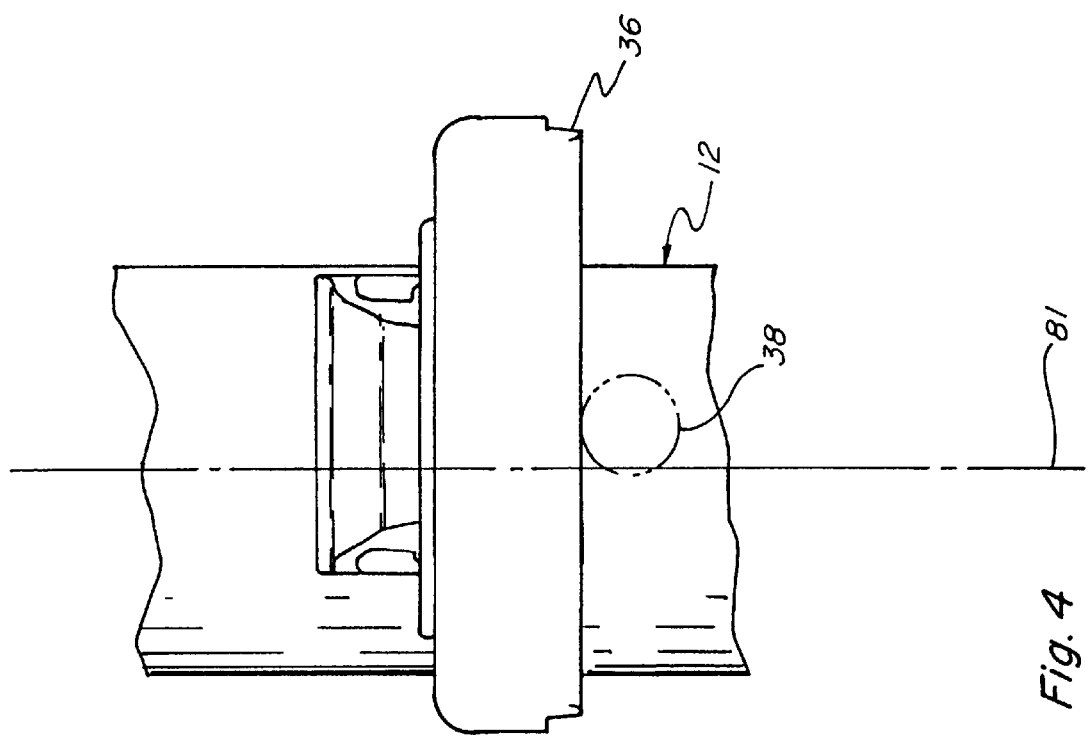
FIG. 4 is an enlarged, fragmentary, simplified end view of the moistener stand of FIG. 1 in the operative position, showing the elevational position and angular orientation of a representative moistening pad thereof in relation to a picker spindle shown in phantom.
Figure 5:
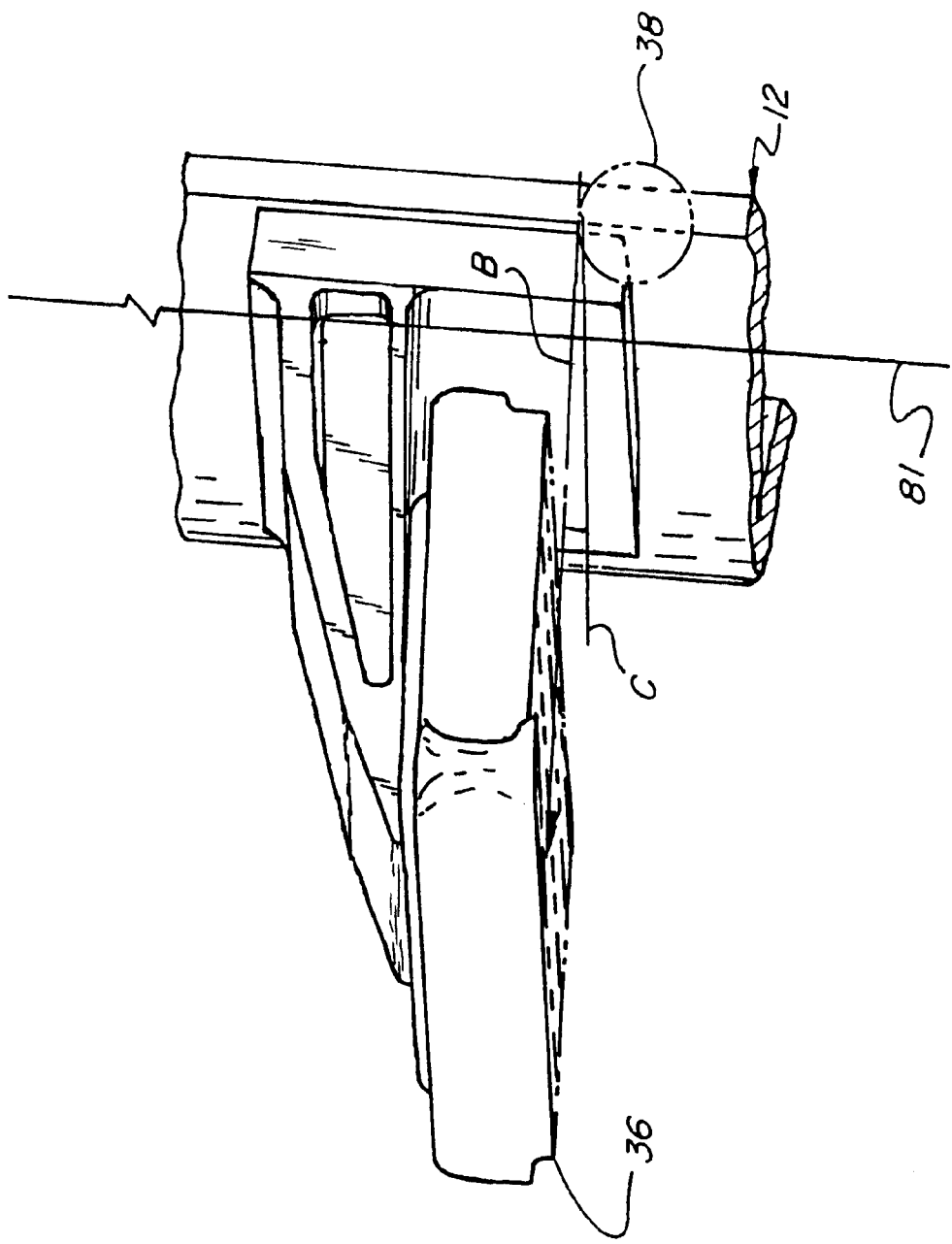
FIG. 5 is another enlarged, fragmentary, simplified end view of the moistener stand of FIG. 1, shown rotated and tilted in a service position and showing the resulting position and angular orientation of the representative moistening pad in relation to the picker spindle shown in phantom.

Referring to FIGS. 4 and 5, they are end views of moistener stand 12 when in its operative position of FIGS. 1 and 2, and when in the service position of FIG. 3, respectively. In FIG. 4, in the operative position, moistener stand 12 is substantially vertical as illustrated by the orientation of longitudinal axis 81 thereof, and moistening pad 36 is in contact with picker spindle 38. In FIG. 5, in the service position, moistener stand 12 is tilted relative to vertical as illustrated by axis 81, and moistening pad 36 is spaced from and raised relative to its position shown in FIG. 4 and thus picker spindle 38. When moistener stand 12 is rotated from the operative position shown in FIG. 4, to the service position of FIG. 5, moistening pads 36 travel along a path, denoted by line B in FIG. 5, which is arcuate and extends upwardly from the height or level thereof when in the operative position, as denoted by line C. When moistener stand 12 is rotated and tilted to a position such as that shown, moistening pads 36 are also tilted, making it easier to inspect the bottom surface thereof, and access the pads for cleaning and replacement.

Figure 6:
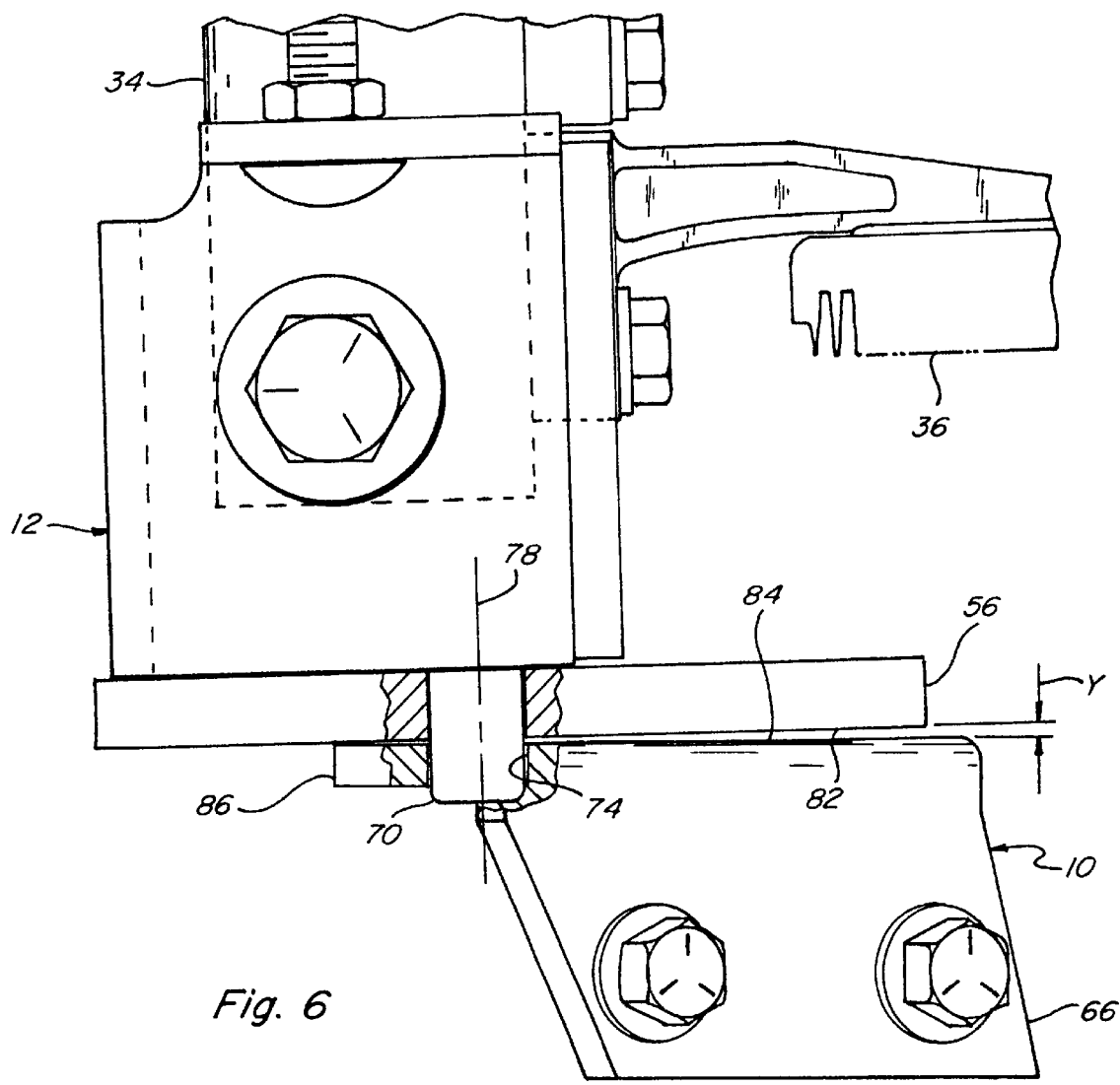
FIG. 6 is an enlarged, fragmentary, simplified side elevational view of the moistener stand of FIG. 1, rotated and tilted in a service position, showing the tilted or angular relationship of a bottom bracket and a base of the support.

Referring to FIG. 6, a side view of lower end 34 of moistener stand 12 is shown when in the service position of FIGS. 3 and 5, pin 70 in bottom bracket 56 being pivoted within hole 74 in base 66, and bottom bracket 56 being tilted relative to base 66 such that a bottom surface 82 of bracket 56 below moistening pads 36 is tilted relative to and spaced above a top surface 84 of base 66 by an amount Y which is preferably at least about 1/64 inch, and as much as about 1/32 inch when offset amount X is about 1/4 inch and about 1/16 inch when X is about 3/4 inch, facilitating the rotational movement of bracket 56 over base 66 between the operative position of FIGS. 1 and 2, and the position shown. This is desirable as one or both of the opposing surfaces 82 and 84 can be covered with dirt, dust, rust, and other material that can make relative rotational movement while in surface-to-surface contact difficult. Note also that base 66 terminates at an edge 86 which is relatively close to pivotal axis 78, such that at least a portion of bottom bracket 56 beneath moistener stand 12 extends in cantilever relation over base 66, which facilitates the tilting and pivoting of bottom bracket 56 over edge 86 and thus the tilting of moistener stand 12.

Figures 7, 8:
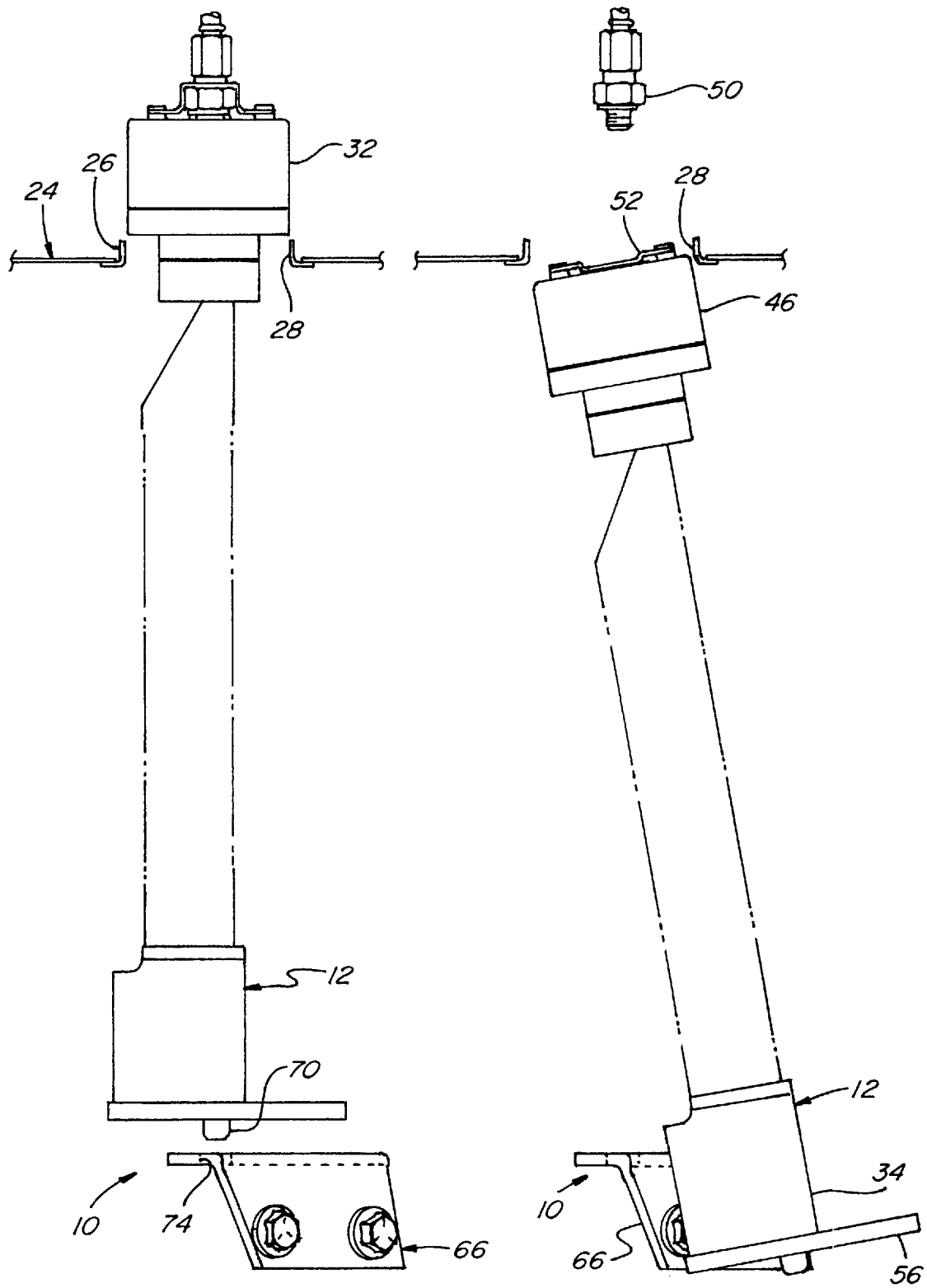
FIG. 7 is a simplified side elevational view of the moistener stand shown lifted to disconnect the support for removal from the cabinet.
FIG. 8 is a simplified side elevational view of the moistener stand being removed from the cabinet.

Referring to FIGS. 7 and 8, also importantly, support 10 facilitates the easy and quick removal of moistener stand 12 from cabinet 24. To remove moistener stand 12 when in a service position as shown rotated away from the operative position, moistener stand 12 can be grasped and lifted such that upper end 32 projects a greater distance through aperture 28 of receptacle 26, sufficiently such that pin 70 is removed from hole 74 in base 66, as shown in FIG. 7. As shown in FIG. 8, moistener stand 12 can then be tilted, for instance, to an angle of about 10° relative to vertical, such that lower end 34 and bottom bracket 56 can be moved outwardly through the cabinet door or opening, to allow upper end 32 to be lowered and removed from aperture 28. The cantilever relation of bottom bracket 56 to base 66 facilitates this additional tilting. At an appropriate time in the removal process, bail 52 can be pivoted and released from nozzle 50 to allow removing nozzle 50 from cap 46 of moisture stand 12. To re-install moistener stand 12 after service or maintenance, upper end 32 is inserted upwardly into aperture 28 and pin 70 positioned over hole 74, then moistener stand 12 lowered such that pin 70 is received in hole 74. Nozzle 50 can then be replaced in cap 46 and bail 52 engaged with nozzle 50 to retain it in position. Moistener stand 12 can then be rotated and pivoted back to the operative position and bolt 64 tightened against bottom bracket 56 to secure the moistener stand in position, as illustrated in FIGS. 1 and 2.

Thus, an advantage of the support 10 of the present invention is the ability to quickly and easily move a moistener stand or column between an operative position and a service or inspection position, with loosening and tightening of only one easily accessible bolt or other fastener. Once loosened, the moistener stand is easily and quickly removable. Because the moistener stand or column is retained by a pinned connection at the lower end, fore, aft and side positions of the moistener stand are retained such that no adjustment of those positions is required when the moistener stand is replaced. Additionally, the original height adjustment of moistening pads 36 is retained, such that unless it is desired or required to adjust the height of moistening pads 36 relative to picker spindles 38, when moistener stand 12 is reinstalled, no height adjustment is required, which also saves time. In the event height adjustment is required, adjusting nut assembly 62 and bolt 58 are readily accessible and are the only elements requiring adjustment.

It will be understood that changes in the details, materials, steps, and arrangements of parts which have been described and illustrated to explain the nature of the invention will occur to and may be made by those skilled in the art upon a reading of this disclosure within the principles and scope of the invention. For instance, pin 70 can be mounted to base 66 instead of bottom bracket. Also, various well known or other height adjusting elements can be used in place of adjusting nut assembly 62. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a cotton harvesting unit having a cabinet having a top portion and a bottom portion defining a space containing a harvesting mechanism including at least one upright bar carrying a plurality of rotatably driven picker spindles arranged in a row one above the other, an elongate upright moistener stand located in the space and supporting a plurality of moistening pads arranged in a row one above the other for moistening the picker spindles, the moistener stand having an upper end and an opposite lower end, the top portion of the cabinet including a receptacle which receives and holds the upper end of the moistener stand for rotation therein about a rotational center thereof, the improvement comprising:

a support pivotally connecting the lower end of the moistener stand to the bottom portion of the cabinet positioning the moistener stand in a predetermined operative position and orientation wherein the moistening pads are positioned for contacting the picker spindles, the support including a pivot element offset from the rotational center of the receptacle holding the upper end such that when the moistener stand is rotated about the rotational center in a first direction away from the operative position the moistener stand will be tilted relative to the orientation thereof when in the operative position to raise the moistening pads relative to the picker spindles.

2. In the cotton harvesting unit of claim 1, the improvement further comprising an element for releasably securing the lower end of the moistener stand to the bottom portion of the cabinet when in the operative position.

3. In the cotton harvesting unit of claim 1, the pivot element allowing the moistener stand to be disconnected from the bottom portion of the cabinet when rotated away from the operative position and tilted, by lifting the moistener stand.

4. In the cotton harvesting unit of claim 1, the improvement further comprising a pivotal axis through the pivot element about which the moistener stand is pivotable, the pivotal axis being offset by at least about ¼ inch from the rotational center of the receptacle.

5. In the cotton harvesting unit of claim 1, the pivot element comprising a pin extending between the bottom bracket and the base.

6. In the cotton harvesting unit of claim 2, the element for releasably securing the lower end of the moistener stand to the bottom portion of the cabinet when in the operative position comprising a single bolt threadedly received in the base and extending through a sidewardly open slot in the bottom bracket.

7. A support for mounting a lower end of a moistener stand in a housing of a harvesting unit of a cotton harvester, the moistener stand having an upper end receivable in a receptacle for rotation therein about a center of rotation therethrough, the support comprising:
 a first element mounted to the lower end of the moistener stand;
 a second element mountable to a bottom portion of the housing;
 a pivot pin pivotably connecting the elements, the pin having a pivotal axis therethrough positioned so as to be offset from the center of rotation when the second element is mounted to the bottom portion of the housing, such that when the moistener stand is rotated about the center of rotation away from a predetermined operative position thereof the moistener stand is tilted relative to a predetermined orientation thereof when in the operative position.

8. The support of claim 7, wherein the moistener stand includes a plurality of moistening pads mounted thereon in position for contacting picker spindles of the harvesting unit when the moistener stand is in the predetermined operative position, the moistening pads being raised above the picker spindles by the tilting of the moistener stand when the moistener stand is rotated away from said operative position and lowered back to the picker spindles when rotated back toward said operative position.

9. The support of claim 8, wherein the moistener stand can be lifted when rotated away from said rotational position to disconnect the elements for removing the moistener stand from the housing.

10. The support of claim 7, wherein the pivotal axis is offset from the center of rotation by at least about ¼ inch.

11. The support of claim 7, further comprising an element for releasably securing the first element to the second element when the moistener stand is in the operative position for holding the moistener stand in the operative position.

12. The support of claim 7, wherein a portion of the first element is located in cantilever relation to the second element for facilitating the tilting of the moistener stand.

13. The support of claim 12, wherein the first element is tilted relative to the second element when the moistener stand is rotated away from the operative position for facilitating the rotation.

14. A support for mounting a lower end of a moistener stand in a housing of a harvesting unit of a cotton harvester, the moistener stand having an upper end receivable in a receptacle for rotation therein about a center of rotation therethrough and a plurality of moistening pads mounted thereon in position for contacting picker spindles of the harvesting unit when the moistener stand is in a predetermined operative position, the support comprising:
 a bottom bracket mounted to the lower end of the moistener stand;
 a base mountable to a bottom portion of the housing;
 a pivot pin pivotably connecting the base to the bottom bracket, the pin having a pivotal axis therethrough offset from the center of rotation such that when the base is mounted to the bottom portion of the housing the moistener stand can be rotated in a predetermined direction away from the predetermined operative position and tilted to raise the moistening pads relative to the picker spindles.

15. The support of claim 14, wherein when the moistener stand is rotated away from the operative position it can be lifted to disconnect the bottom bracket from the base for removing the moistener stand from the housing.

\* \* \* \* \*